United States Patent
Schurb

[11] 3,755,061
[45] Aug. 28, 1973

[54] PREPREG TAPE
[75] Inventor: Joseph N. Schurb, St. Paul, Minn.
[73] Assignee: Minnesota Mining and Manufacturing Company, St. Paul, Minn.
[22] Filed: Oct. 12, 1970
[21] Appl. No.: 80,207

Related U.S. Application Data
[63] Continuation-in-part of Ser. No. 649,167, June 27, 1967, abandoned.

[52] U.S. Cl. ............... 161/143, 117/76 T, 161/78, 161/82, 161/93, 161/142
[51] Int. Cl. ........................ B32b 5/08, D04h 5/00
[58] Field of Search .......... 161/55, 78, 82, 142–144, 161/175, 176, 169, 170, 93; 117/62.2, 75, 76 T, 128.4, 232, DIG. 10

[56] References Cited
UNITED STATES PATENTS

| | | | |
|---|---|---|---|
| 3,352,009 | 11/1967 | Cohn et al. | 117/75 X |
| 3,437,550 | 4/1969 | Paul | 161/93 |
| 3,473,950 | 10/1969 | Wong | 117/66 |
| 2,979,431 | 4/1961 | Perrault | 161/143 X |
| 3,391,050 | 7/1968 | Nebesar | 161/143 X |
| 3,437,550 | 4/1969 | Paul | 161/93 X |
| 2,758,951 | 8/1956 | Case | 161/93 X |
| 3,240,619 | 3/1966 | Winchester | 117/38 |

OTHER PUBLICATIONS
Modern Plastics Encyclopedia 1967, "Boron Fibers," McGraw–Hill Pub., N.Y., Vol. 44, No. 1A, Sept. 1966, pp. 615–616

Primary Examiner—Douglas J. Drummond
Assistant Examiner—Robert A. Dawson
Attorney—Alexander, Sell, Steldt and Delahunt

[57] ABSTRACT

A prepreg tape incorporating collimated large-diameter monofilaments, such as boron monofilaments. Prior to incorporation in the tape the monofilaments are individually precoated with resin composition that does not flow when the tape in which the monofilaments are embedded is subjected to a useful molding operation. In one embodiment, the matrix resin composition of the tape comprises a preformed film and the coated monofilaments are pressed into the film.

7 Claims, 3 Drawing Figures

Patented Aug. 28, 1973 3,755,061

INVENTOR.
JOSEPH N. SCHURB
BY
Carpenter, Kinney & Coulter
ATTORNEYS

PREPREG TAPE

REFERENCE TO RELATED APPLICATION

This application is a continuation-in-part of a copending application, Ser. No. 649,167, filed June 27, 1967, and now abandoned.

BACKGROUND OF THE INVENTION

This invention provides a new prepreg tape—incorporating new kinds of reinforcing filaments in a collimated arrangement and using new constructions to effectively incorporate the filaments. Boron filaments are the most typical of the new kinds of filaments, though other inorganic filaments currently being developed such as silicon carbide, boron carbide, tungsten carbide, and aluminum oxide filaments have similar features. There are two principal differences between glass filaments, which have been predominant as reinforcement in prepreg tapes, and the new filaments. First, the new filaments are large-diameter monofilaments (generally between 1 or 2 and 10 mils in diameter) whereas glass fibers of reinforcement have consisted of strands, yarns, or rovings of many fine (0.2 – 0.6 mils) monofilaments. Secondly, in comparison to glass filaments the new filaments are quite stiff, boron filaments having a tensile modulus of elasticity of about 60,000,000 pounds per square inch, for example. Because of these differences, the methods used to incorporate glass filaments in prepreg tapes are not effective with the new filaments.

One important inadequacy of the conventional methods arises from a difference in spacing required between filaments in a structural member reinforced with the new large-diameter monofilaments and a member reinforced with conventional glass filaments. A structural member reinforced with the new large-diameter monofilaments contains substantially fewer resin-filled interfilament spaces than a structural member reinforced with fine glass monofilaments, and, as a result, each resin-filled space between the new large-diameter monofilaments must accommodate a greater portion of the strain experienced in the member. Furthermore, since the new filaments are much more stiff than glass filaments, they are displaced from their normal position in the structural member a lesser amount than glass filaments are displaced under the same stress, and the resin composition between filaments must undergo more strain to make up the difference. The result of these larger strains between adjacent large-diameter monofilaments is that larger resin-filled spaces are required between the new monofilaments than between fine glass monofilaments, both in prepreg tape and ultimately in the reinforced member made from the tape.

Although sufficient resin is inherently impregnated between fine glass monofilaments when a web of roving is appropriately passed through a dip tank to make prepreg tape, the needed spacing between the new monofilaments cannot be obtained so easily. Large numbers of the new monofilaments, which are quite brittle, stiff, and difficult-to-handle, must be collimated in a compact monolayer, and uniform, controlled spacing must be provided between the monofilaments. Then, while held in the collimated, spaced relation, the monofilaments must be integrated into tape with a matrix of resin. More than that, the uniform spacing between monofilaments must be maintained in the reinforced structural member, despite the fact that it is necessary that the resin in laid-up layers of tape flow under the heat and pressure of the molding operation. In conventional prepreg tapes this needed flow would "wash" the filaments together.

A different obstacle is that the hot-melt and solvent-coating methods used to make glass-filament prepreg tape are inadequate with the new, large-diameter, high-modulus monofilaments. Resin compositions having enhanced strain capability when molded are especially desirable in tapes of this invention to provide tough structural members adapted to accommodate the previously described large interfilament strains. However, these tough resin compositions tend to be of high viscosity and are thus difficult to coat by hot-melt methods.

Solvent-coating methods are undesirable with the new high-modulus monofilaments because of the problems raised by the brittleness of these monofilaments. During the time that breaks are repaired, the resin composition in the portion of tape in the solvent-removing oven is likely to cure excessively.

SUMMARY OF THE INVENTION

In the tape of this invention, in which the above difficulties are overcome, the monofilaments are individually and uniformly precoated with a circumferential layer of precoat resin composition, usually between about 0.1 and 0.5 mil in thickness, before being embedded in the matrix resin composition of the tape. This precoat resin composition is chosen to have a higher viscosity than the matrix resin composition during a useful molding operation, whereby the layers of precoat resin composition exhibit substantially no flow when the tape is subjected to a useful molding operation. The continued presence of the precoat layers around the monofilaments during the molding operation has been found to maintain uniform, controlled spacing between the monofilaments in reinforced structural members made from the tape. The precoat resin composition is also highly adherent to the monofilaments, has high strength when molded, and forms a strong bond to the matrix resin composition during a useful molding operation.

In contrast to the precoat resin composition, the matrix resin composition flows during a useful molding operation before it hardens through cross-linking or cooling to a high-strength condition. In preferred tapes of the invention the matrix resin composition comprises at least one preformed film, and the layer of collimated precoated filaments is embedded in the matrix resin composition by pressing the layer of filaments into the film. Beside avoiding the described disadvantages of hot-melt- and solvent-coating, the use of a preformed film facilitates handling of the filaments. The pressing operation is adapted to straight-line travel of the filaments, and the filaments are required to be held in collimated spaced relation for only a short distance.

In a preferred tape of the invention, the precoat resin composition and the matrix resin composition each comprise heat-curable resin compositions that are reactive with one another. Typically, the precoat resin composition is of the same basic composition as the matrix resin composition but exhibits different flow properties under molding conditions, principally by virtue of a partial precuring of the precoat resin composition.

DRAWINGS

DETAILED DESCRIPTION

Figure 1:
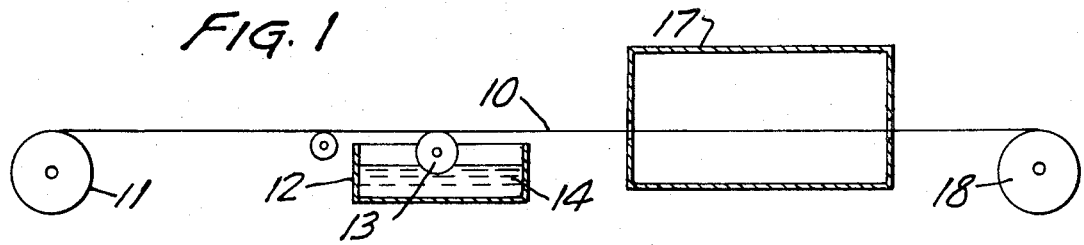
FIG. 1 is a schematic diagram of apparatus for precoating filaments for use in tapes of the invention.

FIG. 1 illustrates one method for precoating filaments according to the present invention. A filament 10, such as a large-diameter boron monofilament, (if not otherwise specified, the description generally will be directed to boron monofilaments) is unwound from a supply reel 11 and drawn through a resin-coating station which consists of a tank 12 and a dip roll 13 partially submerged in a solution of resin composition 14 in the tank. The roll 13 has a circumferential groove (not shown) in which the boron filament 10 rides. As the roll 13 turns, dissolved resin is carried in the the groove from the bath, and this resin is deposited as a precoat 16 on the filament 10 drawn through the groove. The amount deposited depends principally on the solids content of the bath and the speed of traveel of the filament. The coated filament 10 then passes through an oven 17 where the solvent is removed, and, when a heat-curable resin composition is used, the resin composition is partially cured. The resulting coated filament 10, which is preferably tack-free, is then wound on a storage reel 18. Although the procedure is illustrated for one filament, in practice several filaments are drawn at the same time over a dip roll 13 having several axially-spaced grooves.

A plurality of reels 18 of coated filament 10 are mounted on a creel and the filament on each reel unwound from it. The total number of coated filaments 10 used will vary with the width of the tape desired, the diameter of the monofilaments, the thickness of the precoat, and the spacing desired between filaments. The coated filaments 10 are drawn together over a long distance (such as 30 or 40 feet) to avoid sharp bending of the filaments, and pass through a comb 19 having a plurality of side-by-side spaces (dents) separated by dividers; generally, several coated filaments are passed through each dent.

The coated filaments 10 are roughly arranged into a layer by passage through the comb 19. This rough layer of coated filaments is then directed against two bars 20 and 21, and from there, as described in more detail below, the filaments are drawn between squeeze rolls 38 where they are pressed into film. An attempt is made to prevent the coated filaments from crossing over one another during this course of travel, and under the tension applied by the turning of the rolls 38 each coated filament is drawn against the bars 20 and 21 to form a monolayer 22 of coated filaments. The coated filaments are first introduced between the squeeze rolls 38 in a substantially even distribution and in approximate contact, and because of the limitations on movement of the coated filaments provided by the comb 19, bars 20 and 21, and squeeze rolls 38, this even distribution is maintained while the filaments are embedded in film.

A preformed film of resin composition is applied to each side of the layer 22 of coated filaments to provide a thin matrix sheet of resin composition that integrates the layer of filaments and provides a handleable unitary tape. A roll 23 of film 24 is positioned below the layer 22 of filaments in FIG. 2, and a roll 28 of film 29 is positioned above the layer 22 of filaments. A thin (1-mil) glass fabric 25 is embedded in the film 24, and the film is carried on a low-adhesion liner 26 that later serves as a disposable liner on one side of the completed tape. The film 29 is covered by a protective liner 30, and carried on a low-adhesion liner 31 that later serves as a disposable liner on the other side of the completed film. Each assembly of film and liner is unwound from its roll and drawn over arcuate guide plates 34 and 35 toward the layer 22; the protective film 30 over the film 29 is removed and wrapped around a discard roll 33 along the way. Recesses 36 and 37, having almost the exact width of the films 24 and 29, which is the width desired for the completed tape, are provided in the guide plates 34 and 35 and are in register with one another; as a result the films register with one another as they are drawn together.

The monolayer 22 of coated filaments 10, which also has substantially the width of the desired completed tape, enters the recess 36 at a point near the exit end and there contacts the exposed surface of the film 24. The monolayer 22 of filaments and the film 24 and liner 26 are then drawn between squeeze rolls 38 where they are joined with the film 29 and liner 31; and the whole assembly is then drawn through a second set of pull rolls 39. The pressure exerted by the squeeze rolls 38 and pull rolls 39 embeds the filaments into both films 24 and 29 and laminates the films together. A heat lamp 40 may be positioned adjacent each of the guide plates to soften the resin composition and thus facilitate embedding the filaments. The completed tape 41 carried between the liners 26 and 31 is then wound on a storage roll 42.

Figure 3:
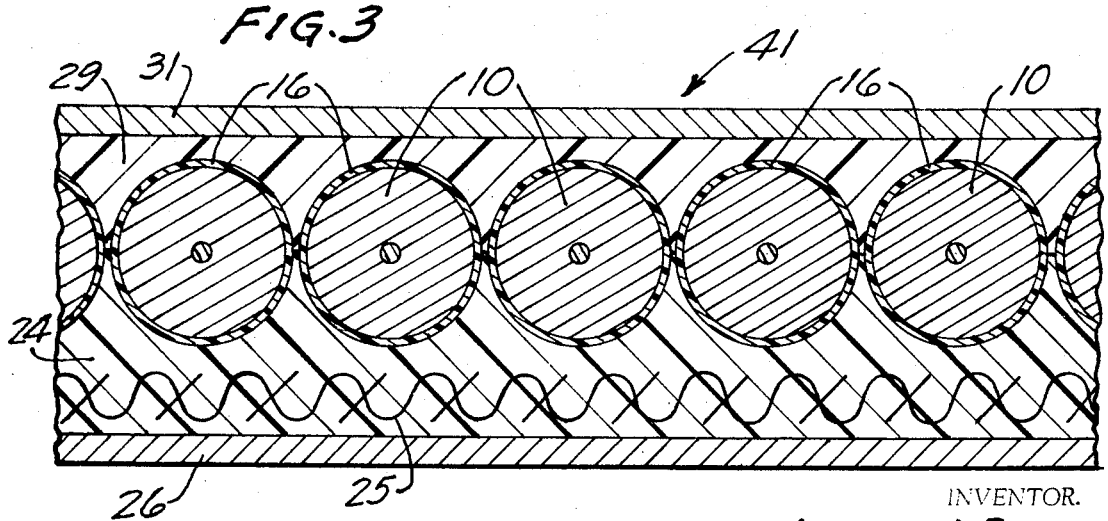
FIG. 3 is a greatly enlarged cross-section of a tape of the invention.

FIG. 3 shows the completed tape 41 in greatly enlarged cross-section. Boron monofilaments are commonly prepared by vapor deposition on a 0.5 mil-diameter tungsten wire; these tungsten wires are shown at the center of the filaments 10 in FIG. 3. The thin fabric 25 is desired by some users because it provides somewhat increased handleability to the tape. This fabric also assures spacing between layers of reinforcement in a molded object, but, in general, the necessary spacing between layers of reinforcement is provided by the precoats 16 on the filaments.

As previously indicated, the individual precoat 16 of resin composition carried by each filament and embedded in the matrix resin composition should substantially not flow at all during a useful molding operation. Instead, the precoat should for the most part remain in place essentially in its original thickness, whereby the original spacing between adjacent monofilaments in the monolayer will be substantially maintained. In contrast to the precoat resin composition, the matrix resin composition should flow during the molding operation, some of it flowing out of the mold as waste and carrying air entrapped in the laid-up layers of tape. In general, at least one or two percent of the matrix resin composition in the laid-up layers of tape should flow out of the mold if void-free molded objects are to be obtained. The flow properties of the precoat and matrix resin compositions and the temperature and pressure and other aspects of the molding operation are controlled to fit the particular circumstances, and are chosen so that the embedded layer of precoat resin composition will not flow, while the less viscous matrix resin composition will flow during the molding operation.

As illustrated in FIG. 3, the spacing between monofilaments is principally provided by the precoat layers 16, but, in addition, some matrix resin composition is typically forced between adjacent precoated filaments. This thickness can be controlled by the size of the monofilaments, their number per inch width of tape, and the thickness of the precoat. While the matrix resin composition between filaments flows during the molding operation, some matrix resin composition often remains between the filaments in the molded object. In a useful molding operation, in which the sides of the laid-up layers of tape are usually restrained against outward movement, the filaments do not separate further than their original spacing when the matrix resin composition flows, and the precoat layers prevent the filaments from washing together.

Two primary factors govern the spacing desired between filaments — the need to accommodate large strains, and the desire to have a maximum concentration of reinforcement. So that the large interfilament strains experienced in a molded object reinforced with large-diameter monofilaments such as 4-mil diameter boron monofilaments can be accommodated and high strengths achieved, the spacing between such monofilaments in prepreg tape should be at least about 0.2 mil. This spacing can be partially provided by the matrix resin composition, but generally the thickness of the precoat layer on such monofilaments should be at least about 0.1 mil. On the other hand, the spacing between large-diameter monofilaments such as 4-mil-diameter boron monofilaments should preferably not exceed about 1 or 1.5 mils, and the thickness of the precoat layer should therefore preferably be no more than about 0.5 or 0.75 mil; more preferably, the thickness of the precoat is less than about 0.4 mil.[1]

[1] In practice, the spacing between filaments may vary somewhat within the same tape. One user of prepreg, boronfilament tape specifies that the spacing between filaments shall be as follows:
No more than 2% shall be spaced less than 0.0002 inch.
89% shall be spaced between 0.0002 inch and 0.0012 inch.
No more than 10% shall be spaced greater than 0.0012 inch.
No more than 5% shall be spaced greater than 0.002 inch.
No. more than 2% shall be spaced greater than 0.010 inch.
No more than 0.5% shall be spaced greater than 0.015 inch.

As will be understood, tape of the present invention may incorporate a wide variety of resin formulations. The particular resin formulations chosen depend on the kind of structural member to be made from tape of the invention and the conditions such as the kind of stress and environment that the structural member will experience during its working life. Some structural members, and accordingly the resin composition from which they are made, must accommodate high strain. Other structural members must retain good strength properties at high temperatures, while ability to accommodate strain is not as important. The final formulation will often represent a compromise providing the best balance of properties that can be obtained.

The present applications for tape of the invention lead to the principal use in the tape of heat-curable resin compositions. Resins such as epoxy resins modified by the inclusion of a tough, high-strength, high-molecular-weight, polymeric component that exhibits substantial elongation when stressed beyond the yield point have been found to be useful resin compositions. Such toughening components include nylons, polyhydroxy ether resins, polyvinyl formal resins, and acrylonitrile-butadiene-styrene resins. All varieties of epoxy resins, including polyglycidyl ethers of polyhydric phenols and cycloaliphatic epoxy resins, are useful in tapes of the invention; cresol novolac epoxy resins, which offer especially good high-temperature properties due to the increased cross-linking obtained, are particularly useful. Other useful heat-curable resin compositions include polyimides, phenolics, and polybenzimidazoles.

Notwithstanding the preference for heat-curable resin compositions, thermoplastic resin compositions that are solids at the temperature of use are also useful in tapes of this invention, and those that are highly viscous at a useful molding temperature are useful as precoat resin compositions. Thermoplastic precoat resin compositions exhibit the advantage of not requiring partial curing after coating of the precoat resin composition. Examples of useful thermoplastic resins are polyhydroxy ethers, acrylonitrile-butadiene-styrene copolymers, polysulfones, and polyphenyleneoxides.

In general, tapes of the invention have a resin-to-filament volume-ratio of between about 35:65 and 65:35. There is a possiblity that voids will occur in objects molded from tapes having a resin content less than about 35 volume-percent, while objects molded from tape having a resin content of more than about 65 volume-percent may have too little reinforcement. Tapes prepared by embedding the precoated filaments in preformed film generally include such a film on each side of the layer of filaments so as to conveniently assure an adequate amount of resin between layers of reinforcement in the molded object. These films are generally tacky since the matrix resin composition in prepreg tapes is preferably tacky and remains so during storage, so that the tapes can be conveniently laid up during a molding operation. The needed thickness of the film or films varies with the desired final resin content in the tape, the number of films used, the thickness of the precoat, and the presence or absence of a fabric in the film or films.

The following examples further illustrate the invention, while also showing some of the different resin formulations used in practicing the invention.

Example 1

Boron monofilaments, formed by vapor deposition on a 0.5-mil diameter tungsten wire and nominally 4 mils in diameter, are coated with a resin composition that includes the following ingredients.

Precoat Resin Composition

| | Parts by weight |
|---|---|
| Semi-solid novolac epoxy resin having an epoxide equivalent weight of 175-182 (Dow-Corning DEN-438) | 100 |
| Polyvinyl formal (molecular weight between 16,000 and 20,000 and including 9.5-13 weight-percent acetate groups, 5-6.5 weight-percent hydroxy groups, and 82 weight-percent formal groups; Formvar) | 10 |
| Boron trifluoride-monoethanolamine complex ($BF_3$ 400) | 3 |

These ingredients are dissolved in a solvent such as a mixture of even parts of methyl ethyl ketone, methyl cellosolve, and diacetone alcohol to give a solution containing approximately 30 weight-percent solids. As illustrated in FIG. 1, the boron filaments are drawn over a coating roller and then, at a rate of 50–150 feet per minute, through a 12-foot long oven in which the temperature is 300°–400°F. The resulting precoat varies in thickness between about 0.1 and 0.3 mil.

To assure that the correct degree of curing has occurred, the softening point of the precoat of resin composition may be determined. A sample of the resin is first scraped off the boron filament with a razor blade, and a small amount of the resulting powder placed between two thin circular plates of glass, 0.125 millimeter thick and 18 millimeters in diameter. The two plates of glass, with the resin powder between them, are placed in the well of a Fisher-Johns melting point apparatus, heated applied to the sample, and the powder observed through an attached magnifying glass. The heat is slowly increased until the powder starts to soften and flow slightly when the upper glass is slightly depressed with a small wooden rod; the temperature at this point is noted and compared with the temperature to be experienced by the precoat during a molding operation.

Figure 2:
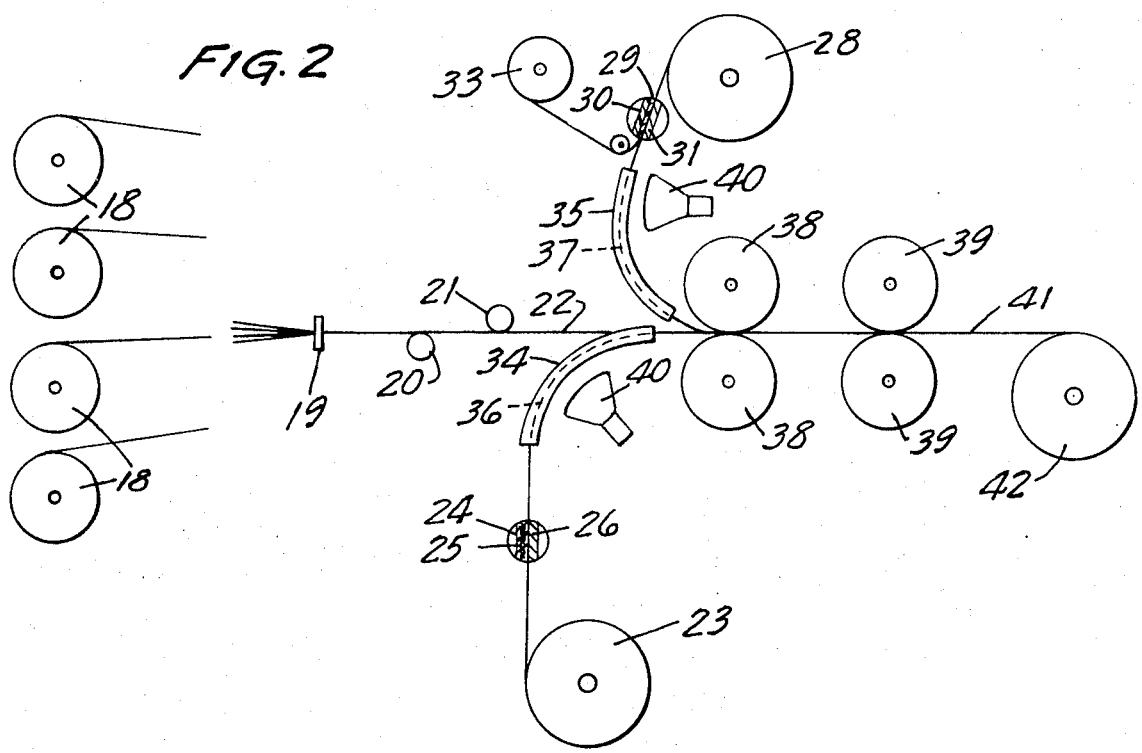
FIG. 2 is a schematic diagram of apparatus for preparing prepreg tape of the invention from precoated filaments.

Three-inch-ide tape is prepared from the coated filaments using apparatus as illustrated in FIG. 2; 210 precoated filaments are typically used per inch of tape width. Approximately eight precoated filaments are assembled in each dent of the comb, and the distance between the creel and comb is about 40 feet. The bars 20 and 21 illustrated in FIG. 2 are glass and are approximately 1 inch in diameter and spaced approximately 2 inches apart along the path of travel of the coated filaments.

The tape is formed using two films that have been preformed, one having a thin 1-mil (Style 104) glass cloth embedded in it. The resin composition of the two films is as follows:

| | Parts by weight |
|---|---|
| Diglycidyl ether of bisphenol A having an epoxide equivalent weight of 190 (Epon 828) | 100 |
| Polyvinyl formal (Formvar) | 25 |
| Dicyandiamide | 6 |

The ingredients are dissolved in a suitable solvent to give a 60 weight-percent solids solution. The glass cloth is dipped in this solution, passed through squeeze rolls, and then through an oven heated to 250°F for 1–4 minutes to drive off the solvent. The resulting fabric-reinforced film, which has a thickness of about 1 to 1.5 mils, is then laid on a liner such as the liner 26 and wound into a roll.

The film without fabric is prepared by knife-coating the above solution onto a carrier liner, such as the liner 31, and then driving off the solvent. A film 1.25 to 1.5 mils thick is produced, after which the coated liner is wound into a storage roll with a liner such as the liner 30.

The coated filaments are embedded in the two preformed films in an operation conducted at room temperature with heat lamps. The resin content is about 55 volume-percent, and the thickness of the tape varies between about 5 and 6 mils. Its volatile content is found (by heating it for 15 minutes at 300°F.) to be less than 1 percent by weight, and the tape has a flow percent by weight at 50 pounds per square inch of about 10 percent.

The strength properties of the tape may be measured by various tests performed on test panels typically made using an autoclave-vacuum bag procedure. A laid-up assembly of tape is first placed in the vacuum bag of an unheated autoclave, after which a vacuum is drawn in the bag and pressure applied externally of the bag so that the total pressure on the assembly is about 85 pounds per square inch. The temperature is then raised at a rate of at least 2°F/minute to 350°F. and held for 1 hour. The temperature in the autoclave is reduced to 150°F. before releasing the pressure and removing the test panel. The test panel is then post-cured in an oven at 350°F. for 4–6 hours. In several of the following tests, test specimens are cut from a 15-ply panel, 3 inches wide, 9 inches long, and 0.075 inch thick.

The specific tests typically used are as follows.

Flexural strength — A test specimen 4.5 inches long and 0.5 inch wide is cut from the 15-ply panel, with the filaments running lengthwise of the specimen. The specimen is laid across two parallel supports spaced 2½ inches apart in a Baldwin universal tesing machine with the supports extending transversely to the direction of the filaments in the panel. A single load is applied to the top and center of the panel midway between the supports at a rate of 0.05 inch per minute.

Horizontal shear strength — A test specimen 0.25 inch wide and 0.6 inch long is cut from the 15-ply panel with the filaments running in the length direction. The test panel is laid across two supports separated along the length of the panel by 0.4 inch, with the supports extending transversely to the length of the panel, or parallel to the filaments. The load is applied centrally on the top of the panel at a rate of 0.05 inch per minute. The application surfaces of the support member and the load member are cylindrical, with 1/16-inch radius.

Transverse flexural strength — A test specimen 3 inches long and 0.5 inch wide is cut from the 15-ply panel, with the filaments running in the width direction, and is supported on ⅛-inch radius steel rods spaced 2 inches apart. The load is applied to the top of the specimen at two points located one inch apart and equidistant from the center of the specimen.

Ultimate tensile strength — A 6-ply test panel, 22 inches long, 1 inch wide, and 0.075 inch thick is prepared as described above, with the filaments in the several plies all arranged lengthwise. The test panel is bonded with a heat-curable epoxy resin-based bonding film to the bottom surface of an aluminum honeycomb core, with the honeycomb cells extending in the depth direction (perpendicular to the test panel). An aluminum sheet 0.125 inch thick is bonded to the top surface of the core with the same bonding film. The aluminum core is 22 inches long, 1 inch wide, and 1.5 inches deep, and has a weight of 23 pounds per cubic foot.

This test assembly is supported on two spaced reaction pads that are each 1.5 inches wide and carry a rubber cover layer between the rest of the pad and the assembly. The two reaction pads are placed at opposite ends of the bottom (test-panel side) of the assembly, with the centers of the pads 20 inches apart. The load is distributed in two equal parts and applied at spaced locations to the top (aluminum sheet) of the assembly. Each partial load is applied on a load pad one inch wide; the center of the two pads are spaced four inches and they are equidistant from the midpoint of the test assembly. The load rate is 0.05 inch per minute.

Tensile modulus of elasticity — The tensile modulus of elasticity is determined from the strain of the test specimen during the above tensile strength test.

Representative results of tests at room temperature for the tape of this example are as follows:

| | Ultimate | Horizontal | Transverse | Modulus |

| Flexural Strength (lb/in²) | Tensile Strength (lb/in²) | Shear Strength (lb/in²) | Flexural Strength (lb/in²) | of Elasticity (lb/in²) |
|---|---|---|---|---|
| 245,000 | 190,000 | 13,000 | 22,000 | 27,000,000 |

The tape of this example provides a structural member capable of accomodating high amounts of strain. To improve other properties, though reducing ability to accomodate strain, the following matrix resin formulation can be used.

Matrix Resin Composition

| | Parts by Weight |
|---|---|
| Epoxy resin (DEN-438) | 100 |
| Polyvinyl formal (Formvar) | 3 |
| Boron trifluoride-monoethanolamine complex | 3 |

The following example illustrates a useful epoxy resin formulation not modified with a toughening agent.

Example 2

Prepreg tape was made from 4-mil-diameter boron filaments by the above procedures using the following resin compositions:

Precoat Resin Composition

| | Parts by weight |
|---|---|
| Cresol novolac epoxy resin having a molecular weight of about 1175, softening point of 80°C., and specific gravity of 1.17 (Ciba ECN 1280) | 1.5 |
| Triglycidyl derivative of para aminophenol having an epoxide equivalent weight of 97–101 and being liquid at 80°F. (Union Carbide ERL-0510) | 0.225 |
| Dicyandiamide (into which colloidal silica (Cab-O-Sil M-5) is milled in an amount comprising 3 weight-percent of the mixture) | 0.15 |

Matrix Resin Composition

| | Parts by weight |
|---|---|
| Cresol novolac epoxy resin (Ciba ECN 1280) | 1.0 |
| Triglycidyl derivative of para aminophenol (Union Carbide ERL-0510) | 0.725 |
| Dicyandiamide mixed with 3 weight-percent colloidal silica | 0.15 |

The following example illustrates an alternative procedure for precoating filaments.

Example 3

Boron filaments having a nominal diameter of 4 mils were coated with a 25-percent-solids solution of polyhydroxy ether (formed from bisphenol A and epichlorohydrin and having an average molecular weight of 20,000 to 30,000, a specific gravity of 1.18, and a softening point of 212°F; Union Carbide PRDA-8080) in methyl ethyl ketone. This thermoplastic resin includes unreacted hydroxyl groups whereby cross-linking reactions are formed between it and an epoxy resin. At 400°F., somewhat over the molding temperature used, the resin's flow properties are such that it is barely pourable. The filaments were drawn between two circular felt pads mounted coaxially, rotatably, and in contact with one another, and partially submerged in a tank containing the above solution. The solvent was removed by blowing hot air over the coated filaments as they left the pads. The precoat layer of resin composition was about 0.2 mil thick.

What is claimed is:

1. A prepreg tape from which are molded high-strength substantially void-free resinous structural members uniformly reinforced with continuous collimated large-diameter monofilaments, said tape comprising a thin flexible matrix sheet of resin composition that first flows and then hardens during a useful molding operation to a high-strength condition; and, embedded in the matrix sheet, a monolayer type of parallel lineally aligned continuous high-strength large-diameter monofilaments carrying individual flexible circumferential layers at least about 0.1 mil in thickness of a precoat resin composition that is highly adherent to the monofilament, has high strength in the molded condition, forms a strong bond to the matrix resin composition during a useful molding operation, and at a useful molding temperature has a higher viscosity than the matrix resin composition whereby the layers of precoat resin composition exhibit substantially no flow when the tape is subjected to a useful molding operation.

2. A tape of claim 1 in which the precoat resin composition is a partially cured crosslinkable resin composition.

3. A tape of claim 1 in which the matrix and precoat resin compositions include ingredients having unreacted functional groups whereby chemical bonds can be formed between them.

4. A tape of claim 1 in which the matrix and precoat resin compositions are based on epoxy resin.

5. A tape of claim 1 in which the matrix resin composition comprises at least one preformed film.

6. A prepreg tape from which are molded high-strength substantially void-free resinous structural members uniformly reinforced with continuous collimated large-diameter monofilaments, said tape comprising a thin flexible matrix sheet of crosslinkable resin composition that first flows and then hardens during a useful molding operation to an infusible and insoluble high-strength condition; and, embedded in the matrix sheet, a monolayer of parallel lineally aligned continuous high-strength high-modulus large-diameter boron monofilaments carrying individual flexible circumferential layers between about 0.1 and 0.5 mil in thickness of a crosslinked precoat resin composition that is highly adherent to the monofilament, hardens during a useful molding operation to an infusible insoluble high-strength condition, forms a strong bond to the matrix resin composition during a useful molding operation, and at a useful molding temperature has a higher viscosity than the matrix resin composition whereby the layers of precoat resin composition exhibit substantially no flow when the tape is subjected to a useful molding operation.

7. A tape of claim 6 in which the matrix and precoat resin compositions are based on epoxy resin.

* * * * *